United States Patent [19]

Wakao

[11] Patent Number: 5,401,463
[45] Date of Patent: Mar. 28, 1995

[54] HYDROGEN-OCCLUSION ALLOY ELECTRODE

[75] Inventor: Shinjiro Wakao, Isehara, Japan

[73] Assignee: Furukawa Denchi Kabushiki Kaisha, Kanagawa, Japan

[21] Appl. No.: 636,754

[22] Filed: Jan. 2, 1991

[30] Foreign Application Priority Data

Jan. 31, 1990 [JP] Japan .................. 2-21181

[51] Int. Cl.$^6$ ............................................. C22C 19/03
[52] U.S. Cl. ........................ 420/459; 420/581; 420/900
[58] Field of Search ............ 420/459, 581, 900; 423/644

[56] References Cited

U.S. PATENT DOCUMENTS

| 4,551,400 | 11/1985 | Sapru et al. | 420/900 |
| 4,983,474 | 1/1991 | Doi et al. | 420/459 |
| 5,006,328 | 4/1991 | Hong | 420/900 |
| 5,104,617 | 4/1992 | Fetcenro et al. | 420/900 |
| 5,281,390 | 1/1994 | Gamo et al. | 420/581 |

FOREIGN PATENT DOCUMENTS

| 59-208036 | 11/1984 | Japan | 423/644 |
| 60-251238 | 11/1985 | Japan | 420/900 |

Primary Examiner—George Wyszomierski
Attorney, Agent, or Firm—James D. Hall

[57] ABSTRACT

A hydrogen-occlusion alloy electrode consisting of a hydrogen-occlusion alloy whose composition is expressed by a general formula $Ti_x Zr_{1-x} V_y Fe_z Ni_{2-y-z}$, wherein $0.1 \leq X \leq 0.9$, $0.3 \leq Y \leq 0.9$ and $0.05 \leq Z \leq 0.5$, or a hydride of said alloy. When made in accordance with this invention, such a hydrogen-occlusion alloy electrode has a large discharge capacity and a long cycle life.

2 Claims, No Drawings

HYDROGEN-OCCLUSION ALLOY ELECTRODE

This invention relates to a hydrogen-occlusion alloy-electrode which is capable of electrochemically occluding and releasing hydrogen and which is used as a negative electrode in a secondary cell or battery.

BACKGROUND AND SUMMARY OF THE INVENTION

Secondary cells or batteries well known in the prior art include nickel-cadmium batteries, lead-acid batteries, and the like. However, they have a common drawback, in that the energy density per unit weight, or unit volume, is comparatively low.

One solution that has been proposed is a nickel-hydrogen cell or battery in which the negative electrode is an electrode made of a hydrogen-occlusion alloy capable of electromechanically occluding and releasing a large quantity of hydrogen.

The positive electrode is made of a nickel oxide and the electrolyte is an alkaline aqueous solution, thus giving a higher energy density. In such a cell the negative electrode is composed of a hydrogen-occlusion alloy such as $LaNi_5$.

However, in the case of the above-mentioned hydrogen-occlusion alloy, it is difficult for it to electrochemically occlude hydrogen sufficiently under atmospheric pressure, because its hydrogen dissociation pressure at room temperature is more than 2 atmospheres. Furthermore, its service life is very short, only about 30 cycles or so, in terms of repeated charge-discharge cycles. These shortcomings combine to make it a rather impractical solution.

The electrode of this invention provides a practical solution to the problems described above and comprises a new and heretofore unknown composition which is extremely effective and readily fabricated.

It is therefore an object of this invention to provide a new hydrogen-occlusion alloy electrode which is capable of occluding hydrogen under atmospheric pressure.

It is a further object of this invention to provide an improved hydrogen-occlusion alloy electrode which gives a large discharge capacity and has a long life.

Further and other objects will become apparent upon consideration of the detailed description of the preferred embodiment of the present invention.

DETAILED DESCRIPTION OF THE PREFERRED EMBODIMENT

The preferred embodiment is not intended to be exhaustive or to limit the invention to the precise form disclosed. It has been chosen and is herein described in order to best explain the invention and its practical use to enable others skilled in the art to best utilize the invention.

The electrode of this invention consists of a hydrogen-occlusion alloy whose composition is expressed by a general formula of $Ti_xZr_{1-x}V_yFe_zNi_{2-y-z}$, wherein, $0.1 \leq X \leq 0.9$, $0.3 \leq Y \leq 0.9$, and $0.05 \leq Z \leq 0.5$ or a hydride of said alloy.

Embodying examples of the present invention are found in the following detailed description of the manner in which the electrode as produced.

Powdered zirconium, titanium, vanadium, nickel and iron were weighed and mixed for a predetermined composition ratio, for instant. $Ti_{0.5}Zr_{0.5}V_{0.5}Fe_{0.2}Ni_{1.3}$, and this mixture was heated and molten by means of an arc melting process so as to obtain a hydrogen-occlusion alloy. This alloy was then pulverized into coarse grains and heated at 900° C. in a vacuum heating device. After introducing hydrogen at one atmosphere of pressure into the vacuum heating device, the alloy therein was cooled down to room temperature to carry out hydrogenation and activation thereof. The hydrogenated alloy so obtained was again pulverized into the powder of less than 400 mesh.

The fine powder of the hydrogen-occlusion alloy obtained through the above process was formed under 5 t/cm$_2$ into circular pellets, each measuring 1 cm in diameter. The pellets were then sintered at 900° C. in a vacuum condition. A lead wire was then attached thereto to obtain a hydrogen-occlusion alloy electrode. The hydrogen-occlusion alloy powder in the electrode was approximately 1 gram in weight.

In the manner as described above, various electrodes consisting of various hydrogen-occlusion alloys made to different specifications were prepared. Using as a working pole each of these hydrogen-occlusion alloy electrodes in combination with a nickel plate electrode serving as a counter pole and 30% wt, % water solution of potassium hydroxide as the alkaline electrolyte, open type test cells were prepared. The charging to each of the test cells was carried out with the charge current having a current density of 6 mA/cm$^2$ until the charge amount thereof reached 130% of the electrochemical hydrogen-occlusion amount of each of said hydrogen-occlusion-alloy electrodes. The discharging was carried out with a discharge current of 6 mA/cm$^2$ until the voltage was dropped to $-0.75$ V vs, Hg/HgO. In this condition, the charge-discharge operation for each test cell was repeated until the capacity thereof became stable, and then the capacity thereof in this stable condition was measured. Also, the number og charge-discharge cycles were repeated until the capacity thereof was dropped to 60% of the stable capacity as above to determine the cycle life of each of the test cells. The results of the discharge capacities and the cycle lives of the test cells having the hydrogen-occlusion alloy electrodes of various compositions ratios are as shown in Table 1 below.

TABLE 1

| Cell No. | Hydrogen-Occluding Alloy | Discharge Capacity (mAh/g) | Cycle Life (No. of Charge Discharge cycles) |
|---|---|---|---|
| 1 | $Ti_{0.5}Zr_{0.5}V_{0.5}Fe_{0.2}Ni_{1.3}$ | 280 | 250 |
| 2 | $Ti_{0.5}Zr_{0.5}V_{0.5}Fe_{0.4}Ni_{1.1}$ | 255 | 250 |
| 3 | $Ti_{0.5}Zr_{0.5}V_{0.75}Fe_{0.25}Ni_{1.0}$ | 303 | 200 |
| 4 | $Ti_{0.5}Zr_{0.5}V_{0.75}Fe_{0.25}Ni_{1.1}$ | 383 | 250 |
| 5 | $Ti_{0.5}Zr_{0.5}V_{0.5}Fe_{0.05}Ni_{1.45}$ | 270 | 150 |
| 6 | $Ti_{0.5}Zr_{0.5}V_{0.5}Fe_{0.2}Ni_{1.0}$ | 200 | 250 |
| 7 | $Ti_{0.5}Zr_{0.5}V_{0.3}Fe_{0.2}Ni_{1.5}$ | 210 | 200 |
| 8 | $Ti_{0.5}Zr_{0.5}V_{0.9}Fe_{0.2}Ni_{0.9}$ | 259 | 100 |
| 9 | $Ti_{0.5}Zr_{0.5}V_{0.2}Fe_{0.2}Ni_{1.6}$ | 190 | 200 |
| 10 | $Ti_{0.5}Zr_{0.5}V_{1.0}Fe_{0.2}Ni_{0.8}$ | 260 | 80 |
| 11 | $Ti_{0.5}Zr_{0.5}V_{0.5}Fe_{0.4}Ni_{1.46}$ | 270 | 90 |
| 12 | $Ti_{0.5}Zr_{0.5}V_{0.5}Fe_{0.6}Ni_{0.9}$ | 180 | 200 |
| 13 | $Ti_{1.0}V_{0.5}Fe_{0.4}Ni_{1.1}$ | 195 | 150 |
| 14 | $Ti_{0.5}Zr_{0.5}V_{0.5}Ni_{1.5}$ | 280 | 50 |

As my clearly be seen from this table, the hydrogen-occlusion alloy electrodes (Cell Nos. 1 to 8) made according to the present invention, all showed satisfactory performance including a discharge capacity exceeding the 200 mAh/g level generally required of a practical hydrogen-occlusion alloy electrode as well as the service life extending over more than 100 cycles.

In contrast thereto, with the electrode of an alloy containing no zirconium therein (Cell No. 13), the discharge capacity was lower than the 200 mAh/g level. This indicates that substitution of zirconium by titanium must be within the range of $0.1 \leq X \leq 0.9$. Further, with the alloy electrode containing no iron (Cell No. 14), the discharge capacity was large, but the service life lasted for only 50 cycles, which is viewed as too short for a practical battery. In addition, when the iron content was too high (Cell No. 12), it resulted in decreased discharge capacity. When the iron content was too low (Cell No. 11), there resulted a shorter cycle life. These indicate that the iron content must be within the range of $0.05 \leq Z \leq 0.5$.

Furthermore, it has been found that the quantity of vanadium in the alloy has much to do with both the discharge capacity and the cycle life. When it is too much (Cell No. 10) the cycle life became shorter while the discharge capacity became low. When it was too small (Cell No. 9) the cycle life became longer, but the discharge capacity was lower than the 200 mAh/g Level. This indicates that the quantity of vanadium should be within the range of $0.3 \leq Y \leq 0.9$.

With a cylindrical type nickel-hydrogen cell so prepared as to have the negative electrode made of the alloy according to the present invention, a publicly known sintered type Ni electrode used as the positive electrode, and 30% water solution of potassium hydroxide as the electrolyte, equally good performance has been obtained. Although sintered type hydrogen-occlusion alloy electrodes were used in the foregoing embodying examples, there may be used any other type electrodes, such as a paste type, such an electrode is made by mixing and kneading fine powder of hydrogen-occlusion alloy with a bonding agent into a paste thereof, and then applying the paste to a collector or carrier so that the paste is filled therein and coated thereon.

It will be obvious from the foregoing that the process and the formulations disclosed can be used to produce a great variety of electrodes with a variety of characteristics and qualities.

As described in the foregoing a hydrogen-occlusion alloy electrode according to the present invention consists of a hydrogen-occlusion alloy whose composition is expressed by a general formula of $Ti_xZr_{1-x}V_yFe_zNi_{2-y-z}$, wherein $0.1 \leq X \leq 0.9$, $0.3 \leq Y \leq 0.9$ and $0.05 \leq Z \leq 0.5$, or a hydride thereof, so that the electrode is capable of occluding or releasing hydrogen sufficiently under atmospheric pressure and thus serving as a hydrogen-occlusion alloy electrode giving high discharge capacity and long cycle life, these being the effects of the present invention.

It will therefore be appreciated that this invention is not limited to the precise form disclosed or by the terms of the above description, but may be modified without departing from the scope of the appended claims.

What is claimed is:

1. A hydrogen-occlusion electrode consisting of:
   a hydrogen-occlusion alloy whose composition is expressed by a general formula of $$Ti_xZr_{1-x}V_yFe_zNi_{2-y-z}$$

wherein,
   X is between 0.1 and 0.9.
   Y is between 0.3 and 0.9 and
   Z is between 0.05 and 0.5.
2. The hydrogen-occlusion alloy electrode of claim 1 wherein said alloy is formed of a hydride of the composition.

* * * * *

UNITED STATES PATENT AND TRADEMARK OFFICE
CERTIFICATE OF CORRECTION

PATENT NO.   : 5,401,463
DATED        : March 28, 1995
INVENTOR(S)  : Shinjiro Wakao It is certified that error appears in the above-indentified patent and that said Letters Patent is hereby corrected as shown below:

Col 2, table 1, line 2-4 should read—

2

| 50 | 2 | $Ti_{0.5}$ | $Zr_{0.5}$ | $V_{0.5}$ | $Fe_{0.4}$ | $Ni_{1.1}$ | 255 | 250 |
|----|---|---|---|---|---|---|---|---|
|    | 3 | $Ti_{0.5}$ | $Zr_{0.5}$ | $V_{0.75}$ | $Fe_{0.15}$ | $Ni_{1.1}$ | 303 | 200 |
|    | 4 | $Ti_{0.5}$ | $Zr_{0.5}$ | $V_{0.75}$ | $Fe_{0.25}$ | $Ni_{1.0}$ | 383 | 7250 |

Signed and Sealed this

Fifteenth Day of October, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,401,463
DATED : March 28, 1995
INVENTOR(S) : Shinjiro Wakao

It is certified that error appears in the above-indentified patent and that said Letters Patent is hereby corrected as shown below:

Column 2 of the specification, at Table 1, Cell Nos. 4, 6, 8 and 11 should read --

| 4 | $Ti_{0.5}\ Zr_{0.5}\ V_{0.75}\ Fe_{0.25}\ Ni_{1.0}$ | 383 | 250 |
| 6 | $Ti_{0.5}\ Zr_{0.5}\ V_{0.5}\ Fe_{0.5}\ Ni_{1.0}$ | 200 | 250 |
| 8 | $Ti_{0.5}\ Zr_{0.5}\ V_{0.9}\ Fe_{0.2}\ Ni_{0.9}$ | 250 | 100 |
| 11 | $Ti_{0.5}\ Zr_{0.5}\ V_{0.5}\ Fe_{0.04}\ Ni_{1.46}$ | 270 | 90 |

Signed and Sealed this

Eighteenth Day of February, 1997

Attest:

BRUCE LEHMAN

*Attesting Officer*  *Commissioner of Patents and Trademarks*